W. H. THIEMER.
UNIVERSAL JOINT.
APPLICATION FILED APR. 17, 1920.

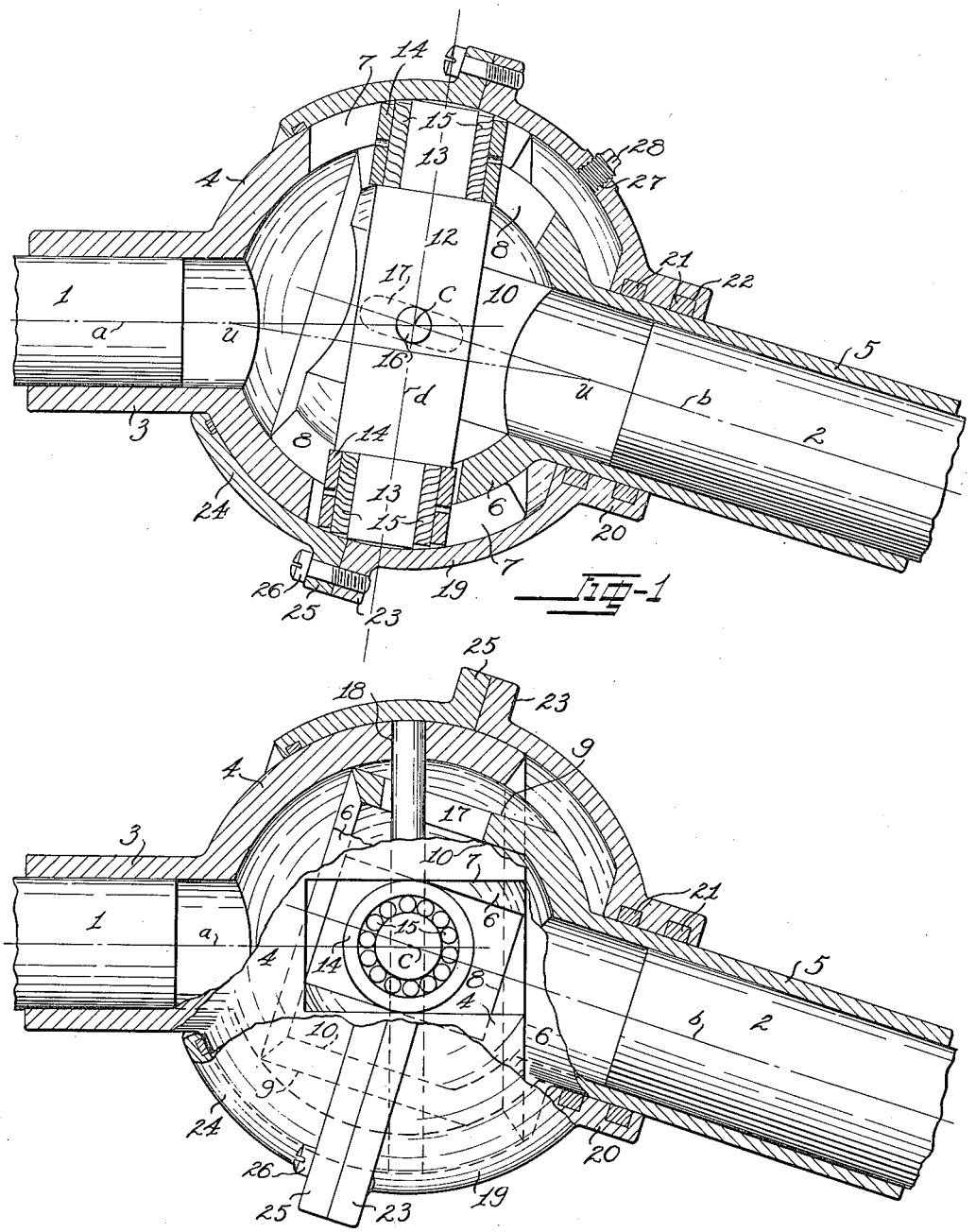

1,436,785.

Patented Nov. 28, 1922.
2 SHEETS—SHEET 2.

Inventor
William H. Thiemer,
By Hull, Smith, Brock West,
Attys

Patented Nov. 28, 1922.

1,436,785

UNITED STATES PATENT OFFICE.

WILLIAM H. THIEMER, OF CLEVELAND, OHIO, ASSIGNOR TO THE PETERS MACHINE & MANUFACTURING COMPANY, OF CLEVELAND, OHIO, A CORPORATION OF OHIO.

UNIVERSAL JOINT.

Application filed April 17, 1920. Serial No. 374,515.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to provide a construction of such joints that will enable a driven shaft, arranged at an angle to a driving shaft, to be driven constantly at the same speed as the latter shaft.

As is well known, in the ordinary type of metallic or rigid universal joint, where the driven shaft is arranged at an angle with respect to the driving shaft, the speed of the driven shaft varies through two maxima and minima during each rotation thereof. This change in velocity is rapid, occurring during each quarter revolution of the shaft. Where the driven shaft is arranged at an angle of 10° with respect to the driving or propeller shaft and the latter shaft is driven at a speed of 500 R. P. M., the maximum velocity of the driven shaft will be 508 and the minimum 492 R. P. M., making a variation of 16 R. P. M. during each quarter revolution. As the angle between the propeller or driving shaft and the driven shaft increases, the variation in speed is correspondingly increased. In the case of automobile transmission, this results, not only in increased friction upon the bearings of the universal joint, but in the imposition of severe strains upon the gears with which the driven shaft is connected and upon the fly wheel upon the propeller shaft.

Figure 3:
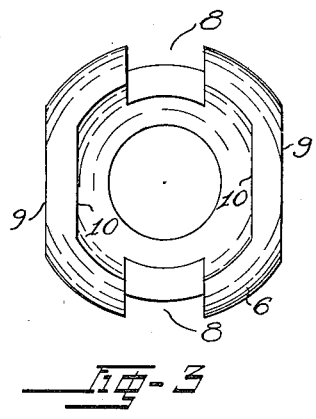
Figure 4:
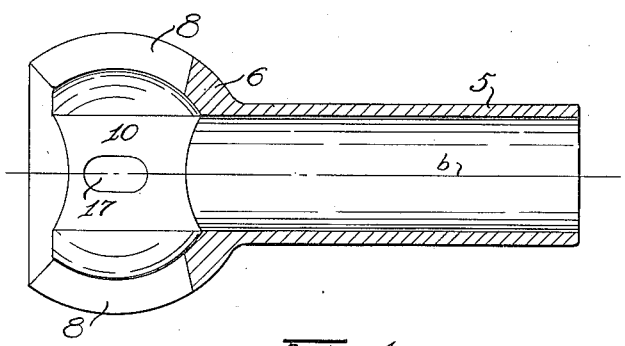
Figure 5:
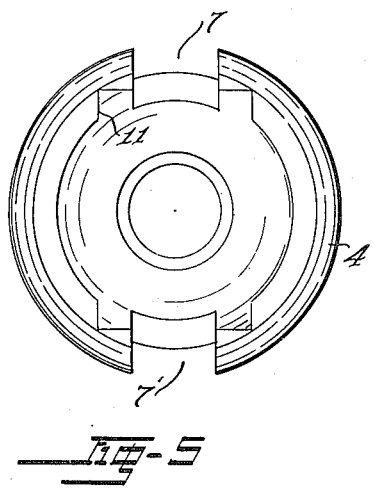
Figure 6:
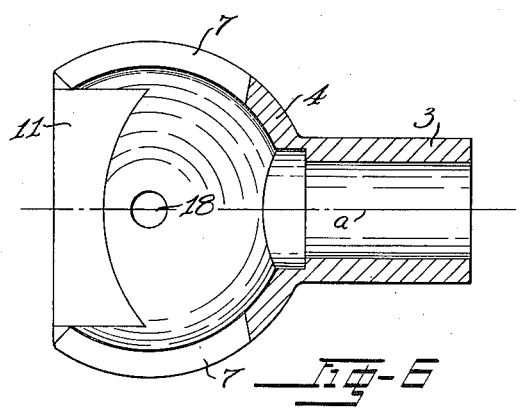

By my construction, I am enabled to couple two angularly disposed shafts by a metallic or rigid universal joint and at the same time to maintain a speed in the driven shaft which is equal at all times to that of the driving or propeller shaft. I accomplish these results in and through the construction shown in the drawings forming part hereof, wherein Fig. 1 represents a central longitudinal view taken through two angularly disposed shafts connected by my joint; Fig. 2 a sectional elevation of the joint shown in Fig. 1, showing the positions of the parts at the end of a quarter revolution of the shaft, the casing being broken away; Fig. 3 a front elevation and Fig. 4 a longitudinal sectional view through the hub and spherical member of the driven shaft and Figs. 5 and 6 views corresponding respectively to Figs. 3 and 4 of the hub and spherical member of the driving or propeller shaft.

Describing the parts by reference characters, 1 denotes the driving or propeller shaft and 2 the driven shaft, the two shafts being shown as having their axes $a$ and $b$ disposed at an angle of 15° with each other. Seated upon and secured to the shaft 1 is a hub 3, having a cup 4, the inner and outer surfaces of which are spherical and concentric with the point of intersection $c$ of the axes $a$ and $b$. Mounted on the shaft 2 is an elongated hub 5 having a cup 6, the inner and outer surfaces of which (with the exceptions to be noted hereinafter) are formed each as the segment of a sphere concentric with the point $c$. The cup 4 is provided with a pair of diametrically opposed slots 7 extending inwardly from the outer end thereof and the cup 6 is provided also with a pair of diametrically opposed slots 8 extending inwardly from the outer end thereof. In order to permit the cup 6 to be assembled within the cup 4, its outer surface is flattened at 9, midway between the slots 8, the inner surface also being flattened at 10, to preserve the thickness of the cup wall. In order to permit the cup 6 to be received within the cup 4, the metal on the inside of the outer end of said cup is cut away, as indicated at 11, in planes parallel to the axis $a$, midway between the slots 7. This will allow the cup 6 to be inserted within the cup 4 with the rounded or spherical parts thereof fitting within the flattened parts 11. When the cup 6 has once been entered, it may be given a quarter rotation, bringing the slots 8 into register with the slots 7. The cups serve as coupling members between the shafts 1 and 2.

The cups 6 and 4 are connected by a driver, indicated generally at 12, and having pins or trunnions 13, each pin being mounted within an annular bushing 14, with helical spring rollers 15 interposed between each pin and its bushing. These pins project outwardly substantially as far as the exterior of the slots 7.

When desired, an anchoring cross pin 16 may be inserted through the driver 12, at right angles to the axis *d* of the latter, the axis of the pin 16 being coincident with the intersection *c* of the axes *a* and *b*. The outer ends of the pin 16 extend through slots 17 in the cup 6 and are mounted in openings 18 in the cup 4, the pin 16 being arranged at right angles to the axis of the shaft 1. This pin is not used for driving purposes, but facilitates the rocking of the driver about the point *c*.

In Fig. 1, a line *u—u* is shown which extends through the longitudinal axis of the driver 12 and intersects the axes *a* and *b* at points equally distant from the point *c*. The longitudinal axis of the driver 12 is at right angles to this line *u—u* and bisects the angle between the axes *a* and *b* of the shafts 1 and 2.

With the parts constructed and arranged as described, when power is applied to the shaft 1, it will be transmitted through the cup 4, bushings 14, rollers 15 and pins 13 to the cup 6. During the rotation of the shaft 1, the axis *d* will always be at right angles to the line *u—u*, since this path is the path of least resistance for the driver. It will also always bisect the exterior as well as the interior angle formed by the axes *a* and *b*. By the construction described, it follows that the speeds of the shaft 2 will be constant throughout each revolution thereof. Where the pin 16 is employed, the manner of mounting the same maintains it always at right angles to the driving or propeller shaft. Should there be any tendency of the pins 13 not to assume a normal position when the shafts 1 and 2 are rotated 90° from the position shown in Fig. 1, this tendency will be cured by the angle (shown in Fig. 2) between the cups 4 and 6 at the slots 7 and 8.

By the construction shown and described herein, the driving connection between the shafts 1 and 2 is automatically varied throughout, and during each rotation of said shafts, so as to secure a speed of the driven shaft which is at all times equal to that of the driving shaft and, with the speed of the driving shaft constant, with a constant speed in the driven shaft and a constant pressure upon the bearing parts.

The provision of rollers 15 accommodates the slight rocking of the driver pins or trunnions during the rotation of the shafts and reduces the frictional resistance which opposes the driver in following its path of least resistance.

For the purpose of lubrication as well as to protect the parts of the joint from dust and other injurious materials, a casing may be applied to the cups 4 and 6. This casing comprises a hemispherical cup member 19 having at one end a hub 20 adapted to surround the hub 5 and provided with packing rings 21 seated in annular grooves 22. The outer end of the cup member 19 is flanged, as indicated at 23, whereby it may be connected to a second cup member 24 also having a flange 25, as by means of bolts 26. The inner surface of the casing is spherical and is adapted to fit over the outer surface of the cup 4. An opening 27 and a plug 28 afford means for introducing lubricant into the casing.

Having thus described my invention, what I claim is:

1. The combination, with a driving shaft and a driven shaft arranged angularly with respect thereto, of coupling members carried by the proximate ends of said shafts, respectively, a driver having its ends mounted in registering slots in said coupling members, and rocking supports for said driver extending in opposite directions from the center thereof and each having its outer end slidably mounted in the coupling member on the driven shaft and anchored in the coupling member on the driving shaft.

2. The combination, with a driving shaft and a driven shaft arranged angularly with respect thereto, of coupling members carried by the proximate ends of said shafts, respectively, a driver having its ends mounted in registering slots in said coupling members, and rocking supports for said driver extending in opposite directions therefrom and each having its outer end slidably mounted in the coupling member on the driven shaft and anchored in the coupling member on the driving shaft.

3. The combination, with a driving shaft and a driven shaft arranged angularly with respect thereto, of coupling members carried by the proximate ends of said shafts, respectively, a driver having the center of its axis coincident with the point of intersection of the axes of said shafts and its outer ends slidably mounted in said coupling members, and rocking supports extending in opposite directions from the axis of said driver and each anchored to the coupling member of the driving shaft and each having a sliding connection with the coupling member of the driven shaft.

4. The combination, with a driving shaft and a driven shaft arranged angularly with respect thereto, of an open-ended spherical connecting member carried by each of said shafts, one of said members being mounted within the other and each of said members being provided with diametrically opposed slots in its outer portion, a driver mounted in said slots and arranged with the center of its axis coincident with the intersection of the axes of said shafts, and a cross pin extending from each side of said driver and each having its axis extending through the center of the axis of said driver, the outer ends of said pins being mounted in the coupling member on the driving shaft and in slots in the other coupling member.

5. The combination, with a driving shaft and a driven shaft arranged angularly with respect thereto, of a coupling member carried by each of said shafts and having each diametrically opposed slots therein, the slots of one member registering with those of the other member, a driver having trunnions at opposite ends thereof, each extending into a pair of said slots, anti-friction devices surrounding each trunnion, and a bushing surrounding the anti-friction devices of each trunnion and mounted in each pair of slots and adapted to bear against the sides of the same.

6. The combination, with a driving shaft and a driven shaft arranged angularly with respect thereto, of a coupling member carried by each of said shafts and each having diametrically opposed slots therein, the slots of one member registering with those of the other member, a driver having trunnions at opposite ends thereof each extending into a pair of said slots, yielding rollers surrounding each trunnion, and a cylindrical bushing surrounding the rollers of each trunnion and mounted in each pair of slots and adapted to bear against the sides of the same.

7. The combination, with a driving shaft and a driven shaft arranged angularly with respect thereto, of a coupling member carried by each of said shafts and each having diametrically opposed slots therein, the slots of one member registering with the slots in the other member, a driver having trunnions at opposite ends thereof each extending into a pair of said slots, rollers surrounding each trunnion, and a cylindrical bushing surrounding the rollers of each trunnion and mounted in each pair of slots and adapted to bear against the sides of the same.

In testimony whereof, I hereunto affix my signature.

WILLIAM H. THIEMER.